June 7, 1949. J. H. LONG 2,472,380
SCREEN FOR OPTICAL DISPLACEMENT GAUGES
Filed March 8, 1946
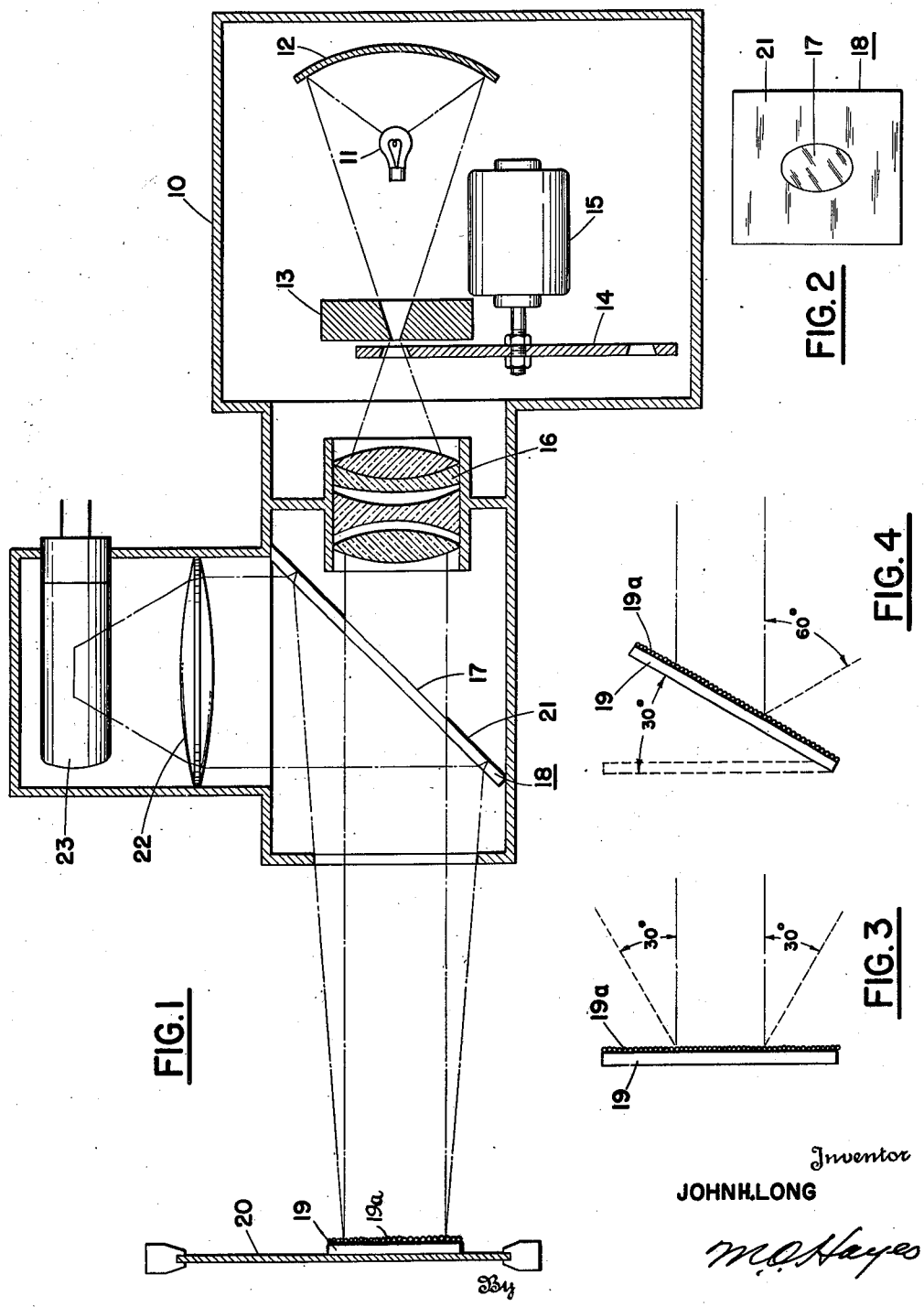
Inventor
JOHN H. LONG
M. O. Hayes
Attorney Patented June 7, 1949

2,472,380

UNITED STATES PATENT OFFICE 2,472,380

SCREEN FOR OPTICAL DISPLACEMENT GAUGES

John H. Long, New York, N. Y., assignor to the United States of America as represented by the Secretary of the Navy Application March 8, 1946, Serial No. 652,907

4 Claims. (Cl. 88—14)

This invention relates to an optical displacement gauge operating on the principle that light intensity varies with distance and employing photoelectric device for measuring changes in light intensity. More particularly, this invention pertains to an improved reflecting screen for use on the element whose displacement is to be detected.

Copending application Serial No. 652,906, filed March 8, 1946, by John Long, Stephen J. Martin and Frank A. Hester, now abandoned, discloses and claims a development of the gauge with a recording device. Copending application Serial No. 652,908, filed March 8, 1946, by John Long and Walter Lupish, now Patent Number 2,437,608, issued March 9, 1948, discloses and claims the basic optical system employed in the gauge.

Various mechanical gauges have been used in the past to measure the movement of an element such as a flat plate. However, when substantial and rapid movement of the plate takes place as in the case of a ship bulkhead subjected to an explosion, such gauges are inadequate due to the inertia of the mechanical elements which must be suddenly accelerated. These gauges also do not have sufficient range. Furthermore, the shock to directly connected mechanical gauges adversely affects their accuracy and makes them difficult to calibrate.

An object of this invention is to provide an improved featherweight gauge which requires no direct connection between the stationary portion of the gauge and the observed element and accurately detects rapidly accelerated movements of the observed element.

Another object is to provide an improved gauge having sufficient range to detect substantial displacements.

Another object is to provide an improved gauge which is easily calibrated and which holds its calibration.

A further object is to provide an improved gauge whose readings are substantially unaffected by the angle of the element whose displacement from the gauge is being detected.

The invention also resides in certain novel features of optical component structures and arrangement which facilitate the carrying out of the foregoing objects and which contribute both to the simplicity of the optical gauge and to the reliability of operation as well as to the ease and expeditious manner of taking measurements.

These results are obtained by an optical gauge in which a substantially parallel-ray beam of light modulated at 10,000 cycles per second or other suitable intervals is projected through an optical system upon a reflecting medium on the element being observed. Light from the reflecting medium returns to a photo-cell in the optical unit and is converted into 10,000 cycle electric currents whose intensity varies in accordance with the intensity of reflected light. The intensity of the reflected light varies in accordance with the distance between the fixed optical unit and the moving element under observation. The varying electric currents produced have values which are a function of the position of the moving element and which may be measured by suitable means.

Other objects and advantages of the invention will become apparent from the following detailed description taken in connection with the accompanying drawing, in which:

Figure 1 is a general view of the apparatus.

Figure 2 is a detailed view of the light transmitting mirror.

Figure 3 is a view of the reflecting screen when perpendicular to a light beam.

Figure 4 shows the screen at an angle of 30° to the light beam.

While the invention is susceptible of various modifications and alternative arrangements, I have shown in the drawings and will herein describe in detail the preferred embodiments. It is to be understood, however, that I do not intend to limit the invention by such disclosure for I aim to cover all modifications and alternative arrangements falling within the spirit and scope of the invention as defined in the appended claims.

Figure 1 shows a housing 10 which contains a light source 11 and a concave mirror 12 arranged to send light through an aligned aperture plate 13 which light is interrupted by aperture disc 14 driven at high speed by motor 15. This light is projected in a substantially parallel-ray beam through lens 16 and oval clear portion 17 of mirror 18, which is set approximately 45° to the axis of lens 16, to the reflecting medium 19 on observed element 20. The light is returned from element 20 along the axis of lens 16 to the silvered mirror portion 21 which faces element 20. The mirror portion 21 reflects the light to lens 22 and photo-cell 23 which face the mirror on an axis approximately at right angles to the axis of lens 16. The variations of current in the photo-cell are measured by suitable means.

Mirror 18, although shown in Figure 2 in a preferable form having an oval clear central portion 17, may be a partially silvered reflector or may take other forms of partially transmitting partially reflecting mirrors.

Reflecting medium 19 is preferably a diffuse reflecting glass or resin beaded screen of the motion picture type about 6 inches across, cemented to the element. The beads are designated 19a. The beaded screen reflects substantially the same amount of light regardless of the angle of the observed element up to a deflection of 30°. For an angle of 45° the drop in reflection is approximately 4%.

Figure 3 shows the angle of 30° to either side of a perpendicular through which the screen reflects a constant amount of light. For an angular deflection of 30° the reflected rays are still within the zone of constant reflection as shown in Figure 4.

When the gauge is in operation a displacement of the element 20 toward the light source 11 will reduce the distance the light has to travel not only from the light source 11 to the reflecting screen 19 but also from the reflecting screen to the photo-cell 23. As light intensity varies inversely with the distance from the source this decrease in distance will increase the intensity of the light received by the photo-cell 23. The resulting higher reading on the measuring means gives an indication of the displacement. This change in reading may be calibrated to provide exact measurement of the distance moved by the element. When the element moves away from the light source there will be a corresponding decrease in the intensity of light reaching the photo-cell.

What is claimed is:

1. In an optical gauge for measuring changes in distance from an element to the stationary portion of the gauge, a stationary mounting, a constant light source on said mounting, means for detecting light reflected from the element, an optical system for projecting a light beam from said source upon the element and directing the reflected beam to the measuring means, the light paths between the element and the optical system being substantially coaxial, and a movable portion securable to said element for maintaining the amount of reflected light substantially constant throughout a substantial angle of movement of said movable portion, said portion comprising a mass of reflecting globules mounted in operative position on the element.

2. In an optical gauge for measuring the displacement of an element, a light source, a light intensity detecting device, a fixed support for said source and device, a diffuse reflector having substantially constant reflection over a wide angle mounted in operative position on the element, and an optical system for projecting light from the source to the reflector and directing the reflected light to the measuring device along light paths which are substantially coaxial between the reflector and the optical system.

3. In an optical gauge for measuring displacement of a movable element, a gauge support, a constant light source mounted fixedly on said support and adapted to transmit light to said element, detecting means fixed on said support for detecting light reflected from said element, and means for maintaining the amount of reflected light constant, throughout a substantial angular movement of said movable element with reference to the line of light flow from the source to the reflector, said means comprising a mass of transparent globules distributed uniformly over an area of said element in line with the light from said source.

4. In an optical gauge for measuring displacement of a movable element, a gauge support, a constant light source mounted fixedly on said support and adapted to transmit light to said element, detecting means fixed on said support for detecting light reflected from said element, and means for maintaining the amount of reflected light constant, in angular movement of the element of at least 30° on either side of a reference plane coinciding with the element and perpendicular to the line of light flow from the source to the reflector.

JOHN H. LONG.

REFERENCES CITED

The following references are of record in the file of this patent:

UNITED STATES PATENTS

| Number | Name | Date |
|---|---|---|
| 1,399,566 | Lazarus | Dec. 6, 1921 |
| 1,455,795 | Logan | May 22, 1923 |
| 1,866,581 | Simkian | July 12, 1932 |
| 2,437,608 | Long et al. | Mar. 9, 1948 |

FOREIGN PATENTS

| Number | Country | Date |
|---|---|---|
| 363,219 | Italy | Sept. 22, 1938 |